June 24, 1952  W. C. SVERKERSON  2,601,571
GLASS STAND
Filed Jan. 6, 1951
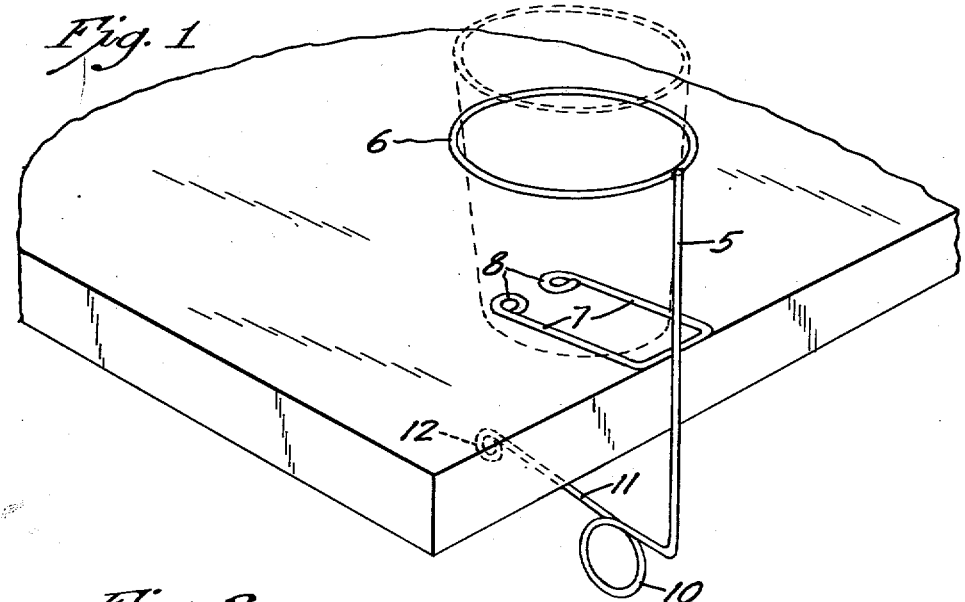
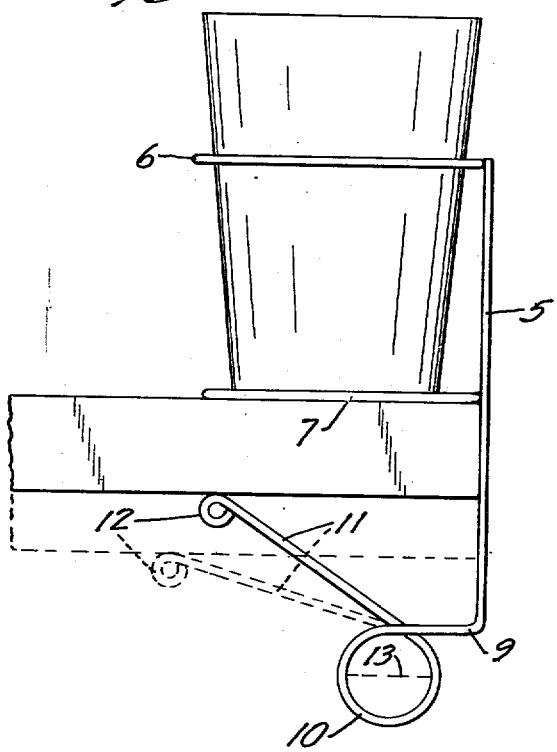
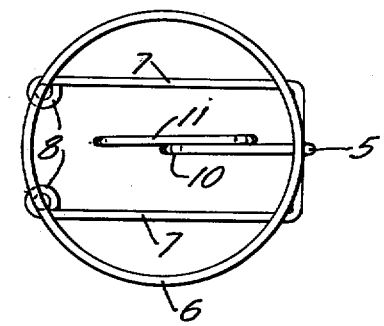
INVENTOR.
William C. Sverkerson
BY
Williamson & Williamson
ATTORNEYS Patented June 24, 1952

2,601,571

UNITED STATES PATENT OFFICE 2,601,571

GLASS STAND

William C. Sverkerson, Robbinsdale, Minn., assignor of one-half to Roy Petefish, Minneapolis, Minn.

Application January 6, 1951, Serial No. 204,759

1 Claim. (Cl. 211—74)

This invention relates to glass holders.

More particularly, it relates to glass holder attachments adapted to engage the peripheral portions of a table or other object having similar peripheral portions and to receive and support a glass in upright position upon the table's upper surface.

It is the general object of my invention to provide a novel and improved glass holder of cheap and simple construction.

A more specific object is to provide a novel and improved glass holder which can be manufactured of a minimum amount of material and which will operate in a more efficient manner, and under varied conditions.

Another object is to provide a glass holder capable of being readily mounted upon the peripheral portions of tables or other similar objects having similar peripheral portions, even though the tables or objects vary substantially in thicknesses.

Another object is to provide a glass holder constructed with a minimum of material and yet having an improved clamping action as a result of the manner of formation of its essential component parts.

These and other objects and advantages of my invention will more fully appear from the following description made in connection with the accompanying drawings, wherein like reference characters refer to the same or similar parts throughout the several views, and in which Fig. 1 is a perspective view of one embodiment of my invention attached to the peripheral portions of a table.

Fig. 2 is a side elevational view of a similar embodiment attached to the peripheral portions of a table of substantially greater thickness; and Fig. 3 is a top plan view of the embodiment shown in Fig. 1.

The entire unit embodying my invention as shown in Figs. 1–3 is characterized by its open framework and its construction from a minimum amount of material. As shown, the entire unit is made of stiff but resilient rod material of small diameter, this rod material being preferably of a light-weight metal. The embodiment shown in Figs. 1–3 includes an upright rod 5 which has fixedly secured to its upper end a ring 6. Fixedly secured to the medial portions by welding or some other suitable means is a generally U-shaped combined glass support and table-top-engaging member 7. The length of the arms of the table-top-engaging member 7 as shown is substantially equal to the diameter of the ring 6, and the distance between these two arms is less than the diameter of the bottom of the glass to be supported. This means, of course, that the distance between the arms 7 is also substantially less than the diameter of the ring 6. As best shown in Fig. 3, the ends of the arms of the U-shaped member 7 are reversed upon themselves as at 8 to provide a broad gripping surface for the arms.

The rod 5 at a point 9 a substantial distance below the point of attachment of the U-shaped member 7 is bent sharply inwardly and then downwardly as at 10 and reversed upon itself to provide an upwardly and inwardly extending clamping arm 11. The extreme end of the rod 5 and the clamping arm 11 is reversed upon itself as at 12. The reversing of the rod 5 upon itself forms a substantially circular framework at its lower end, this circular framework being of substantial diameter as shown by the broken line indicated as 13 extending thereacross.

In operation, my glass holder can be attached to the peripheral portions of a table or similar object by simply drawing downwardly on the clamping arm 11 and sliding the peripheral portions of the table between the U-shaped bracket 7 and the upper end 12 of the clamping arm. Upon the release of the clamping arm 11 the entire unit will be firmly mounted upon the table top, this being especially true if the outer edge of the table top is moved to a position where it abuts against the rod 5 as shown in Fig. 1 and Fig. 2. The spaced arms of the U-shaped member 7 with their reversely curved end portions 8 are highly effective in preventing any tendency for the unit to tip sideways which may result from the same being bumped by a user. The resilient clamping arm 11 firmly engages the underside of the table top to clamp the entire unit in an efficient manner to hold the same rigid with respect to the table. The glass desired to be supported, of course, is inserted through the ring 6 from above to a position where the bottom of the glass will rest upon the U-shaped member 7.

One of the advantages of my glass holder is that it may be constructed with a minimum amount of material and that the entire unit has an open framework. Since the unit may be constructed entirely of rod material of small diameter, there are no obstructions to the vision of the user when desiring to refer to the glass to determine the amount of its contents. Thus, it can be seen that the amount of the contents of a glass may be readily visualized at a glance when the glass is supported by our glass holder. At the same time, a very minimum amount of rod material is required to manufacture the glass holder.

An even more important advantage of my glass holder is the improved clamping action which I attain as the result of reversing the rod 5 upon itself at its lower portion. By reversing the rod 5 upon itself, I have utilized to a maximum extent the benefit of the resiliency inherent in the rod. It can be readily seen that by reversing the rod 5 upon itself, the arm 11 is provided with considerably more efficient clamping action than if the rod 5 had merely been curved in a spiral. I have found that a clamping arm formed in the manner described above displays considerably greater resiliency than a clamping arm made of the same material and shaped in a different manner.

Another advantage of my glass holder is its ready adjustability to receive the peripheral portions of tables which vary substantially in thickness. As shown in Figs. 1 and 2, my glass holder will as readily receive a table top which is relatively thick as compared to a table top of a lesser thickness. If the object upon which the glass holder clamps is found to be extremely thick, my glass holder may be readily adapted to be mounted on such an object by merely increasing the extent to which the clamping arm 11 is bent forwardly. In other words, by shortening the diameter of the portion which is reversed upon itself of the rod 5 the clamping arm will be adjusted to receive objects of substantially greater thickness between it and the table-top-engaging member 7.

It should be noted that the open framework U-shaped member 7 which supports the glass and at the same time engages the top of the table to provide the necessary clamping action in conjunction with the clamping arm 11 also supports the glass in spaced relation with respect to the table top. Thus, it can be readily seen that any condensation which may take place upon the outer surface of the glass will be prevented from immediately being disposed upon the upper surface of the table. Hence, unless this condensation is extremely rapid, the moisture which will collect upon the outer surface of the glass will re-evaporate without being disposed upon the table top. If the glass were permitted to rest upon the table top, this moisture would, of course, wet the table top and cause damage thereto.

Thus, it can be seen that I have provided a novel and improved glass holder capable of being manufactured from a minimum amount of material and capable of functioning in an improved manner.

It will, of course, be understood that various changes may be made in the form, details, arrangement and proportions of the various parts without departure from the scope of the present invention, which, generally stated, consists in the matter shown, and described, and set forth in the appended claim.

What I claim is:

A glass holder for a table or other object having a similar peripheral portion comprising a stiff but resilient upright rod, an open-framework glass-engaging element secured to the upper end portion of said rod, and an open-framework table-top-engaging element mounted on the medial portion of said rod and extending horizontally therefrom, the lower end portion of said rod being bent inwardly, then downwardly and then reversed upon itself to extend upwardly and inwardly to a point adjacent to and below said table-top-engaging element to provide a resilient arm to engage the underside of the table and exert the necessary clamping force in conjunction with said table-top-engaging element to maintain said rod and hence the glass engaged by said glass-engaging element in upright position.

WILLIAM C. SVERKERSON.

REFERENCES CITED

The following references are of record in the file of this patent:

UNITED STATES PATENTS

| Number | Name | Date |
| --- | --- | --- |
| 503,410 | Everett | Aug. 15, 1893 |
| 1,286,649 | Kayser | Dec. 3, 1918 |
| 1,913,587 | Edwards | June 13, 1933 |
| 2,071,155 | Alexander | Feb. 16, 1937 |
| 2,302,737 | Bearden | Nov. 24, 1942 |
| 2,370,822 | Taurman et al. | Mar. 6, 1945 |
| 2,461,825 | Kowalski | Feb. 15, 1949 |